(12) United States Patent
Kaiser et al.

(10) Patent No.: US 10,429,077 B2
(45) Date of Patent: Oct. 1, 2019

(54) DOMESTIC OVEN HAVING A DOOR WITH TWO DOOR WINGS

(71) Applicant: Electrolux Appliances Aktiebolag, Stockholm (SE)

(72) Inventors: Kersten Kaiser, Rothenburg ob der Tauber (DE); Fabienne Reinhard-Herrscher, Rothenburg ob der Tauber (DE); Reiner Horstmann, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 343 days.

(21) Appl. No.: 15/307,388

(22) PCT Filed: Jun. 24, 2015

(86) PCT No.: PCT/EP2015/064252
§ 371 (c)(1),
(2) Date: Oct. 28, 2016

(87) PCT Pub. No.: WO2015/197690
PCT Pub. Date: Dec. 30, 2015

(65) Prior Publication Data
US 2017/0051922 A1      Feb. 23, 2017

(30) Foreign Application Priority Data

Jun. 26, 2014 (EP) .................................... 14174085

(51) Int. Cl.
*F24C 15/02*      (2006.01)
*F24C 15/16*      (2006.01)
*A47J 27/00*      (2006.01)

(52) U.S. Cl.
CPC ........... *F24C 15/021* (2013.01); *A47J 27/002* (2013.01); *F24C 15/02* (2013.01); *F24C 15/16* (2013.01)

(58) Field of Classification Search
CPC .. A21B 3/02; F24C 15/02; A47J 27/14; E05F 5/12
See application file for complete search history.

(56) References Cited

U.S. PATENT DOCUMENTS 1,355,868 A  * 10/1920  Trenkamp ............... F24C 15/02
                                                      126/190
1,598,715 A  *  9/1926  Gray ..................... E05F 17/004
                                                      49/109

(Continued)

FOREIGN PATENT DOCUMENTS

CN        203662590 U      6/2014
GB            25616 A      7/1911

OTHER PUBLICATIONS

International Search Report issued in corresponding International Application No. PCT/EP2015/064252 dated Oct. 2, 2015, 3 pages.

*Primary Examiner* — Jorge A Pereiro
(74) *Attorney, Agent, or Firm* — Pearne & Gordon LLP (57) ABSTRACT

A domestic oven (1) comprising a heatable oven cavity (2) having a frontal opening (3), and a door (4) for closing said frontal opening (3), wherein the door (4) comprises a first door wing (5) and a second door wing (6), wherein each door wing (5, 6) comprises a first vertical edge (7, 8) that is mounted pivotally about a vertical axis (a, a') respectively on one of the opposite sides (9, 10) of said frontal opening (3) to a structure (11) of the domestic oven (1) for a movement between a closed position (c) and an open position (b) of the door (4), wherein in said closed position (c) of the door (4)

(Continued)

the door wings (5, 6) form a vertical gap (12) between adjacent second vertical edges (13, 14) of either door wing (5, 6).

17 Claims, 5 Drawing Sheets (56) References Cited

U.S. PATENT DOCUMENTS

| | | | | |
|---|---|---|---|---|
| 1,841,868 A * | 1/1932 | Wuebling | E06B 7/232 | 126/190 |
| 2,025,480 A * | 12/1935 | Sponsler | E05F 17/004 | 49/103 |
| 2,447,184 A | 8/1948 | Jones et al. | | |
| 2,889,825 A * | 6/1959 | Evans | F24C 15/02 | 126/198 |
| 3,045,663 A | 7/1962 | Roy et al. | | |
| 3,091,232 A * | 5/1963 | Allen, Jr. | E05F 7/005 | 126/190 |
| 3,895,849 A * | 7/1975 | Zehr | A62C 2/12 | 16/51 |
| 4,226,489 A * | 10/1980 | Haag | E05C 19/161 | 312/296 |
| 4,288,135 A * | 9/1981 | Buchser | F25D 23/028 | 312/296 |
| 4,408,372 A * | 10/1983 | Kimura | F16B 21/073 | 24/662 |
| 5,061,022 A * | 10/1991 | Meriwether | E05C 7/04 | 292/33 |
| 5,205,075 A * | 4/1993 | Moyer | F16B 2/243 | 49/492.1 |
| 5,289,658 A * | 3/1994 | Lusen | F16B 2/243 | 277/637 |
| 5,395,126 A * | 3/1995 | Tresslar | F16J 15/022 | 277/637 |
| 5,722,202 A * | 3/1998 | Cooper | E05F 17/004 | 49/109 |
| 5,737,991 A * | 4/1998 | Kite, III | F16J 15/061 | 49/498.1 |
| 5,918,885 A * | 7/1999 | Radke, II | F24C 15/021 | 24/458 |
| 5,988,154 A * | 11/1999 | Douglas | A21B 3/04 | 126/20 |
| 6,629,335 B1 * | 10/2003 | Derman | E05C 17/52 | 16/82 |
| 7,111,360 B1 * | 9/2006 | Hsu | E05C 19/04 | 16/82 |
| 8,226,180 B2 * | 7/2012 | Patil | E05F 17/004 | 312/325 |
| 8,510,991 B2 * | 8/2013 | Collene | E05F 1/1066 | 312/405 |
| 8,689,781 B1 * | 4/2014 | Chilton | F24C 15/022 | 126/191 |
| 8,839,564 B2 * | 9/2014 | Happel | E06B 7/22 | 49/368 |
| 8,944,536 B2 * | 2/2015 | Yantis | F24C 15/02 | 312/324 |
| 9,151,107 B2 * | 10/2015 | Kaczmarczyk | E06B 7/2309 | |
| 9,188,346 B2 * | 11/2015 | Yantis | F24C 15/02 | |
| 9,328,929 B2 * | 5/2016 | Yantis | F24C 15/02 | |
| 9,335,055 B2 * | 5/2016 | Chilton | F24C 15/02 | |
| 9,494,323 B2 * | 11/2016 | Yantis | F24C 15/02 | |
| 9,644,848 B2 * | 5/2017 | Yantis | F24C 15/02 | |
| 9,814,311 B2 * | 11/2017 | Mueller | A47B 81/00 | |
| 9,890,957 B2 * | 2/2018 | Yantis | F24C 15/02 | |
| 2005/0198909 A1 * | 9/2005 | Qiang | F24C 15/021 | 49/492.1 |
| 2007/0039605 A1 | 2/2007 | Larsen | | |
| 2007/0246036 A1 * | 10/2007 | Larsen | F24C 15/021 | 126/190 |
| 2008/0209812 A1 * | 9/2008 | Lancry | F25D 21/04 | 49/316 |
| 2008/0276925 A1 * | 11/2008 | Griswold | F24C 15/022 | 126/19 R |
| 2009/0145031 A1 * | 6/2009 | Collene | E05F 1/1066 | 49/113 |
| 2010/0139169 A1 * | 6/2010 | Patil | E05F 17/004 | 49/103 |
| 2011/0186029 A1 * | 8/2011 | Swayze | E06B 7/16 | 126/190 |
| 2013/0200767 A1 * | 8/2013 | Mueller | A47B 81/00 | 312/295 |
| 2014/0007508 A1 * | 1/2014 | Bourque | F24C 15/02 | 49/366 |
| 2014/0069409 A1 * | 3/2014 | Yantis | F24C 15/02 | 126/198 |
| 2014/0070685 A1 * | 3/2014 | Yantis | F24C 15/02 | 312/319.2 |
| 2014/0251300 A1 * | 9/2014 | Chilton | F24C 15/021 | 126/190 |
| 2014/0251301 A1 * | 9/2014 | Chilton | F24C 15/02 | 126/198 |
| 2015/0082705 A1 * | 3/2015 | Kaczmarczyk | E06B 7/2309 | 49/368 |
| 2017/0260800 A1 * | 9/2017 | Gravel | E06B 7/2305 | |

* cited by examiner

DOMESTIC OVEN HAVING A DOOR WITH TWO DOOR WINGS

The present invention relates to a domestic oven comprising at least a heatable oven cavity having a frontal opening, and a door for closing said frontal opening, wherein the door comprises a first door wing and a second door wing.

To keep the heat produced during operation of an oven inside an oven cavity, usually ovens, such as domestic ovens are equipped with a single door acting as a thermal barrier. Opening and closing the door, however, is necessary for the user to access the oven cavity for putting food into and/or out of the cavity, as well as for other intended interactions with the food during a heat treatment thereof or for cleaning the cavity after getting dirty.

Usually, hinges are used for the linkage of such oven door to the oven structure, which allow for an opening/closing movement of the door relative to the cavity. This movement can be either about a horizontal axis, wherein such hinges are arranged at a horizontal edge of the oven door, such as, for example, known from so called "drop down doors", or this movement can be in a about a vertical axis, wherein such hinges are arranged at a vertical edge of the oven door, such as, for example, known from so called "side opening door".

However, in each case the oven door in an opening movement and/or an opening position projects outwards from the oven thereby limiting the access to the food and the cavity and reducing the space for an opening or closing movement.

To improve said disadvantages and limitations, French-style doors or butterfly doors where applied, which comprise two winged doors being hinged at one vertical edge each and upon an opening movement, each door projects outwards from the oven with only half the distance compared to a usually applied door as described above.

The document US 2007/0039605 A1 describes a cooking appliance including two "French style" side doors, which are connected by a door linkage system.

However, such cooking appliances still have to be improved with regard to the tightness of the door in a closed position, the comfort of access to the food and/or the oven cavity and/or the comfort of operating the oven doors.

It is an object of the present invention to provide a domestic oven, having improved user comfort in operating said oven. It is a further object of the present invention to provide a domestic oven, having an improved seal and tightness in a closed position. It is a still further object of the present invention to provide a domestic oven, enabling an improved access to the food.

The above objects of the invention are achieved by the domestic oven of the present invention.

A domestic oven according to claim 1 comprises a heatable oven cavity having a frontal opening, and a door for closing said frontal opening, wherein the door comprises a first door wing and a second door wing, wherein each door wing comprises a first vertical edge that is mounted pivotally about a vertical axis, respectively on one of the opposite sides of said frontal opening to a structure of the domestic oven for a movement between a closed position (c) and an open position (b) of the door, wherein in said closed position (c) of the door the door wings form a vertical gap between adjacent second vertical edges of either door wing.

Such a domestic oven offers the possibility to the customer to approach close to the oven cavity, when the door and/or at least one of the door wings is open. This is advantageous over, for example, kitchen appliances having a so called "drop down door", particularly because such drop down door in the opened position separates the user from the appliance in that such door acts as a spacer between user and appliance. Therefore, the domestic oven according to the present invention provides a better accessibility to the oven cavity and/or oven interior, either for checking the status of the cooking goods or for cleaning purposes.

In a first preferred embodiment of the invention the door further comprises at least one thermal shield that is arranged at said second vertical edge of at least one of said door wings, preferably at a cavity-side surface, such that said at least one thermal shield essentially covers laterally said vertical gap.

Said at least one thermal shield protects the vertical gap, and if present, an elastic sealing of said vertical gap, against direct effect of heat and pollution from inside the cavity. Whereas conventional ovens with a heatable oven cavity that can be closed by a single frontal door comprise a heat and steam seal formed of an elastic material that is arranged in a region outside of the oven cavity where it is shielded from the oven atmosphere, usually on a metal front frame that surrounds the oven cavity and which is covered by the circumferential outer regions of the oven door. However, any elastic sealing arranged in the vertical gap between first and the second door wing of an oven with two door wings would be exposed directly to the aggressive heated air, moisture and fumes of burned food stuff, that impair over time the structural integrity and esthetical appearance of the elastic seal.

The thermal shield preferably is arranged at a second vertical edge of at least one of said door wings such that it essentially covers laterally said vertical gap on or at a cavity-side surface of the door wings. Such thermal shield can be arranged, in general at each door wing, i.e. a second door wing and/or a first door wing.

Preferably, a thermal shield is arranged, preferably on or at a cavity-side surface of at least one door wing, such that a thermal shield overlaps and traverses laterally the vertical gap, more preferably, shields an elastic sealing arranged at a second vertical edge of a door wing, if present.

Preferably, the door comprises a first door wing and a second door wing which in the closed position of the door form a vertical gap between adjacent second vertical edges of either door wing and at least one elastic sealing for sealing said vertical gap against the escape of heat or steam from the oven cavity. Preferably said at least one elastic sealing is arranged on at least one of said second vertical edges of said first or second door wing. A first elastic sealing can be is arranged on the second vertical edge of said first door wing and/or a second elastic sealing can be arranged on the second vertical edge of said second door wing. Still preferably, said at least one elastic sealing can be adapted to bear elastically, as the case may be, against the opposing one of the second vertical edge of the second door wing or of the first door wing or against the opposing one of the second elastic sealing of the second door wing or of the first door wing. Still preferably, said elastic sealing can be formed essentially of a high-temperature resistant silicone material that resists temperatures of up to 300° C. during a food preparation operation of the heatable oven cavity or said elastic sealing can be formed essentially of a glass-fiber material that resists temperatures of up to 450 to 500° C. such as occur during a so-called pyrolytic cleaning operation wherein the empty oven cavity is heated up to said temperatures in order to burn any soiling food residues to ashes.

Importantly, the present inventors have found that the thermal shield of the invention that is arranged on the oven cavity side of at least one of the door wings in order to cover the vertical gap between the wings of a double oven door and hence an elastic heat and steam seal that is arranged inside said gap effectively protects said elastic seal from losing its elastic sealing properties due over time to the exposure to the aggressive atmosphere inside the heated oven cavity. As said above, a dedicated thermal shield for the elastic seal is not any component needed in a conventional single door oven, since there the elastic seal is arranged inside a shielded gap between the front frame and the door which is always present.

A thermal shield preferably has the form of an essentially rectangular plate. Preferably, the main plane of such thermal shield is dimensioned according to essentially the height of the door wings and essentially the width of the gap between both door wings. Still preferably the main plane of such thermal shield is dimensioned according to essentially cover the height of the cavity-side of the door wings that covers the opening of the oven cavity. Also still preferably, the main plane of such thermal shield is dimensioned according to essentially cover at least the width of the vertical gap, i.e. the dimensions of a thermal shield, preferably are sufficient to cover the vertical gap. The width of the thermal shield can be adapted to allow in addition for its fixation to the corresponding door wing.

In a preferred embodiment of the invention, the first door wing comprises at least one first thermal shield and/or the second door wing comprises at least one second thermal shield, wherein the at least one first thermal shield and/or the at least one second thermal shield is arranged, preferably on or at a cavity-side surface of the first door wing and/or the second door wing respectively, such that said thermal shield covers an at least one first elastic sealing arranged at a second vertical edge of the first door wing and/or an at least one second elastic sealing arranged at a second vertical edge of the second door, preferably, such that the at least one first elastic sealing and/or the at least one second elastic sealing is shielded from the oven cavity.

It will be immediately understood by a person skilled in the art, that one or both door wings may comprise such thermal shield. In a preferred embodiment the thermal shields overlap each other, and thereby advantageously enhance and accumulate their shielding properties, particularly, if both door wings comprise such thermal shield at a second vertical edge of each door wing. Preferably, a second door wing comprises a second thermal shield which overlaps a cavity-side surface of said first door wing, or a first door wing comprises a first thermal shield which overlaps a cavity-side surface of said second door wing. Preferably, the first door wing comprises a first thermal shield and the second door wing comprises a second thermal shield and said second thermal shield is arranged such that it at least partially overlaps said first thermal shield or vice versa, such that said first thermal shield and said second thermal shield essentially cover laterally said vertical gap.

The term "open position" as used herein, preferably correspond to a position of an opening angle of at least about 90°.

As used herein the term "first vertical edge" preferably means the vertical edge of a door wing, wherein said vertical edge is mounted pivotally to the structure of the domestic oven about a vertical axis. A "second vertical edge" as used herein, preferably means the free vertical edge of a door opposing its first vertical edge. More preferably, the second vertical edges of a pair of door wings form a vertical gap in between the second vertical edges.

In a domestic oven according to the present invention, each door wing comprises a first vertical edge that is mounted pivotally on one of the opposite sides of said frontal opening to the structure of the domestic oven about a vertical axis each. It will be understood that such vertical axis preferably is a substantially vertical axis. Preferably, the first door wing and the second door wing are arranged on a left and right side of the domestic oven, respectively.

Preferably, a domestic oven according to the present invention is equipped with a door layout, comprising at least one pair of a first and a second door wing, wherein said first and second door wing, more preferably, are arranged to act as counter rotating door wings.

In an advantageous embodiment of the inventive domestic oven said at least one thermal shield is manufactured of a heat resistant material, preferably selected from enameled steel, ceramic or LCP plastics.

Such material is advantageous in that the thermal shield preferably shields the vertical gap or other parts, e.g. a sealing, from the heat within the cavity. Thereby, such thermal shield—due to the heat resistant material—exhibits further advantages, for example, an enhanced energy efficiency of the domestic oven according to the present invention.

In an advantageous embodiment of the inventive domestic oven the door comprises at least one elastic sealing for sealing said vertical gap, wherein preferably said at least one elastic sealing is arranged on at least one of said second vertical edges of said first door wing and/or of said second door wing.

An elastic sealing as described in connection with the various embodiments of the domestic oven according to the present invention, preferably is for sealing the vertical gap between the two door wings, preferably when the door is in a closed position. Such closed position, preferably is a position wherein both, the first door wing is in a closed position and the second door wing is in a closed position. It will be immediately understood that such elastic sealing is advantageously sealing the cavity and thus prevents and/or reduces heat loss, particularly a heat loss through the vertical gap.

It will also be immediately understood that the domestic oven according to the present invention may comprise also other sealing elements for sealing other parts of the cavity against heat loss, e.g. each door and/or the surrounding of the central opening of the cavity may comprise, at least partially, a peripheral seal extending around the dimensions of such door or frontal opening. An elastic sealing according to the present invention may form part of such peripheral sealing.

It will also be understood immediately that an elastic sealing for sealing the vertical gap between the two door wings may be split in two parts, i.e. one first elastic sealing which is arranged at a second vertical edge of the first door wing and one second elastic sealing which is arranged at a second vertical edge of said second door wing. Thereby, in a position wherein both door wings are in a closed position, the elastic sealings are in contact with each other and lie in juxtaposition, thus sealing the vertical gap. However, such elastic sealing may also be in a one-part form, arranged at a second vertical edge of either the first or the second door wing. Thereby, in a position wherein both door wings are in a closed position, the elastic sealing on the one door wing is in contact with and lies in juxtaposition to the second vertical edge of the other door wing, thus sealing the vertical gap.

In an embodiment of the domestic oven according to the present invention where a first thermal shield is arranged at a second vertical edge of a first door wing and a second thermal shield is arranged at a second vertical edge of a second door wing, preferably on or at a cavity-side surface of the first door wing and/or the second door wing respectively, said first thermal shield and said second thermal shield, more preferably, are arranged such that the first thermal shield and the second thermal shield do not touch each other, whereby in between said first thermal shield and said second thermal shield said vertical gap is formed. In such an embodiment where preferably an elastic sealing is arranged on each of said second vertical edges of said first door wing and of said second door wing said thermal shields may not shield said elastic sealings. In such configuration the elastic sealing on the one door wing, preferably is in contact with and lies in juxtaposition with the elastic sealing on the other door wing, however, is not shielded from the heat of the cavity. Such configuration is advantageous in that both, the first and the second door wing may be opened separately and independently, particularly without the thermal shield(s) interfering such opening and/or closing of each door wing to be opened separately and independently.

In a preferred embodiment of the domestic oven according to the present invention the first and the second door wing, at least partially overlap at least partially. For example, the second vertical edge of a first door wing may overlap the second vertical edge of the second door wing, or vice versa. It will be understood that the "second vertical edge" as used herein, preferably, is the side of a first door wing being in contact with the second door wing, and vice versa, in a closed position. Such configuration advantageously will improve the heat isolation.

In an advantageous embodiment of the inventive domestic oven the first door wing or the second door wing comprises a thermal shield that is arranged, preferably at a cavity-side surface of the first door wing, such that it essentially covers laterally said vertical gap, preferably wherein said thermal shield essentially covers at least one of said at least one elastic sealing such that at least one of said at least one elastic sealing is shielded from the heatable oven cavity, still preferably wherein said second door wing comprises a second thermal shield which overlaps a cavity-side surface of said first door wing; or wherein the first door wing comprises a first thermal shield and the second door wing comprises a second thermal shield, and said second thermal shield is arranged, preferably at a cavity-side surface of the door wing, such that it at least partially overlaps said first thermal shield such that said first thermal shield and said second thermal shield essentially cover laterally said vertical gap, still preferably wherein said first thermal shield and said second thermal shield essentially cover at least one of said at least one elastic sealing such that at least one of said at least one elastic sealing is shielded from the heatable oven cavity, still preferably wherein said second thermal shield overlaps a cavity-side surface of said first thermal shield.

It will be immediately understood that such configuration(s) are of particular advantage where the entire vertical gap, and preferably the entire sealing at the vertical gap is laterally covered and/or traversed and shielded by at least one thermal shield, preferably arranged at a cavity-side surface of the first door wing, in that such configuration is energy efficient. This is, as the vertical gap and, preferably, the sealing is shielded from the heat within the heatable cavity.

However, in such embodiments where a thermal shield laterally covers and/or traverses the vertical gap between the door wings, the first door wing and the second door wing may have to be opened in a sequential door opening, in order to avoid an unwanted damaging of said thermal shield. It is immediately understood that in a closing action of the door, the sequence of the door wings, preferably is in reverse order.

In an advantageous embodiment of the inventive domestic oven the first door wing and the second door wing, and, preferably at least one of said at least one thermal shield, if present, and/or at least one of said at least one elastic sealing, if present, is arranged such that a movement of the second door wing between a closed position (g) and an open position (f) is allowed if the first door wing is in an at least partially open position (d), and wherein said movement is not allowed if the first door wing is in a closed position (e).

In a preferred embodiment of the invention, the first door wing and the second door wing, and, preferably at least one of said at least one thermal shield and/or at least one of said at least one elastic sealing is arranged such that a movement of the second door wing between a closed position of the second door wing and an open position of the second door wing is allowed, if the first door wing is in an open position of the first door wing, and wherein such movement is not allowed, if the first door wing is in a closed position of the first door wing.

Such arrangement is advantageous as a sequential door opening is achieved, wherein at first, the first door wing is to be opened by moving the first door wing from its closed position, preferably to its open position and, subsequently the second door wing is allowed to be opened.

However, alternatively the first door wing and the second door wing, and, preferably at least one of said at least one thermal shield and/or at least one of said at least one elastic sealing is arranged such that a movement of the second door wing between a closed position of the second door wing and an open position of the second door wing is allowed, if the first door wing is not in its closed position, i.e. in an open position or in an essentially half open position of the first door wing, and wherein such movement is not allowed, if the first door wing is in a closed position of the first door wing.

Referring, preferably to both alternatives, the first door wing has to be opened or at least essentially half-opened first, before the second door wing can be opened. It will be thus immediately understood that in such configuration the second door wing can be opened only if the first door wing is not in its closed position.

In an advantageous embodiment of the inventive domestic oven the door comprises at least one first handle arranged at an outside surface of at least said first door wing or at least said second door wing, in particular wherein one of said first handle is arranged at the outside surfaces of each of said first door wing and said second door wing.

It will be immediately understood that such first handle is for opening said door, at least partially, and in particular for opening the at least one door wing, the first handle is arranged on, preferably by pulling said first handle.

In an advantageous embodiment of the inventive domestic oven the door comprises at least one second handle arranged at a second vertical edge of at least said second door wing, preferably wherein said second handle is accessible only if said first door wing is in its open position (d). Such second handle is, preferably arranged and/or hidden in the vertical gap, preferably when both door wings are in a closed position said second handle is not accessible by the user.

Preferably, the door comprises at least one first handle arranged at an outside surface of said first door wing, and an at least one second handle arranged at the second vertical edge of the second door wing, wherein said second handle is accessible only if said first door wing is in its open position (d), and wherein a movement of the second door wing between said closed position (g) and said open position (f) is allowed, if the first door wing is in said open position (d), and wherein such movement is not allowed, if the first door wing is in said closed position (e). In a preferred embodiment of the invention, the door comprises a second handle arranged at the second vertical edge of said second door wing, preferably wherein said second handle is accessible only if said first door wing is in its open position. In a preferred embodiment where a door wing comprises said second handle a thermal shield is arranged such that said second handle is protected and/or shielded from the heat of the oven cavity and thus is prevented from being heated. Said arrangement improves the comfort for the user as a second handle is arranged hidden in the vertical gap and is kept at a temperature for being touched immediately after opening a first door wing. In a preferred embodiment only one door wing, more preferably the first door wing, comprises such first handle, wherein at least one door wing, preferably the second door wing, comprises such second handle. It will be understood that said second handle, i.e. being, preferably, hidden at a second vertical edge of a door wing and, more preferably, thus in the vertical gap, is accessible only after one door wing, preferably the first door wing, is opened by a first handle.

Such second handle as described herein in connection with the various embodiments of the domestic oven according to the present invention is of particular advantage, where both door wings are to be opened sequentially—one after the other. In other words, at first a door has to be opened by operating a first handle at a first door wing for opening said first door wing, than the second handle(s) hidden in the vertical gap at the second vertical edges become accessible and can be operated to open the second door wing.

It will be immediately understood that such second handle, preferably is non-visible in a position where both door wings are in a closed position, and said second handle can be used only, if a first door wing is already open.

In a preferred embodiment of the invention, said second door wing comprises an at least one thermal shield, wherein the at least one thermal shield is arranged at a second vertical edge of the second door wing such that said thermal shield traverses laterally the vertical gap and essentially covers at least one of said at least one elastic sealing preferably such that at least one of said at least one elastic sealing is shielded from the heatable oven cavity, wherein at least one of said at least one elastic sealing is arranged at each of a second vertical edge of the first door wing and a second vertical edge of the second door wing, wherein the door comprises at least one first handle arranged at an outside surface of said first door wing, and an at least one second handle arranged at the second vertical edge of the second door wing, wherein said second handle is accessible only if said first door wing is in its open position, and wherein a movement of the second door wing between said closed position and said open position is allowed, if the first door wing is in said open position, and wherein such movement is not allowed, if the first door wing is in said closed position.

In an advantageous embodiment of the inventive domestic oven said first door wing and/or said second door wing comprises, preferably at its respective cavity-side surface, at least one rail for supporting a tray or a grid, preferably wherein said tray or grid can be moved in and out of the oven cavity on corresponding rail at essentially the same height position on a side wall of the cavity.

Such rail is of particular advantage if serving as a support structure for accessories. For example, a tray or a sheet may be slide and supported on said rail. However, such rail may not be restricted to said purpose. A "tray" as used herein, preferably, is selected from the group comprising baking tray, drip rack and pizza tray. A "grid" can be a grid made of steel wires that can support for example a food vessel.

Such rail is of particular advantage, especially where the cavity is of a width greater than the height or depth. With such geometry there is, due to the breadth of the sheet or tray, an increased risk of tipping and tilting of the tray or grid. The rail, preferably arranged at the inner surface of at least one of the door wings, is arranged in a height corresponding to the side rail for supporting a tray or a sheet at the inner cavity walls. Said side rails at the inner cavity walls are thus continued by the side rails arranged at the inner surface of at least one of the door wings and advantageously stabilize the tray or grid.

In an advantageous embodiment of the inventive domestic oven said at least one rail on at least one door wing comprises a first end region facing the cavity, wherein said at least one rail is configured such that said first end region slopes downwards.

It is to be understood that preferably between the side rails arranged at an inner cavity wall and the continuing side rails on at least one door wing arranged, in particular on respective cavity-side surfaces of the door wings a gap is formed. The ends of said sider rails on a cavity side wall, which are directed toward said gap, i.e. the first end region facing the cavity, are configured to slope downwards. This advantageously allows an easy insertion or sliding out of the tray or grid without interference with the side rails, particularly in the gap.

In an advantageous embodiment of the inventive domestic oven the domestic oven comprises a door linkage system, preferably a mechanical door linkage system that is configured such that said first door wing and said second door wing are kinetically interconnected for and/or capable of a synchronized pivotal movement of said first door wing and said second door wing between said closed positions (e, g) and said open positions (d, f), in particular wherein in a synchronized successive pivotal movement first said first door wing and then said second door wing move between said closed positions (e, g) and said open positions (d, f).

Preferably, a mechanical door linkage system is configured such that the first door wing and the second door wing are kinetically interconnected for a synchronized pivotal opening/closing movement of the first door wing and the second door wing. Preferably, the first and the second door wing are kinetically connected via a door linkage system, which enables a synchronized opening and closing procedure of both door wings. For example, both door wings may be opened essentially simultaneously with a one-hand movement, e.g. a pulling action only on one first handle of a first door wing, preferably, the first door wing and the second door wing being mechanically, in particular kinetically, coupled. In such configuration the second door wing may be forced by the door linkage system to undergo an opening/closing movement synchronized to an according opening/closing movement of the first door wing.

In an advantageous embodiment of the inventive domestic oven the door and/or the door linkage system comprises a door lock mechanism, wherein said door lock mechanism is capable of locking at least one of the at least one of the door wings such that at least one of the door wing is locked in its closed position (e, g) and/or in its open position (d, f), wherein preferably the door lock mechanism is a detachable plug connection, more preferably comprising a spring-loaded clamping cam and a plug.

Preferably, the domestic oven and/or the first door wing and/or the second door wing comprises a door lock mechanism for locking the first door wing and/or the second door wing in a closed position and/or the open position.

Such door lock mechanism allows to fix the door and/or door wing in a predetermined position, preferably closed position and/or in an open position. In an open a locking is preferred at an opening angle of about 90°. It is particularly advantageous if the door lock mechanism is capable of locking at least one, is preferably both, door wings in their respective open position at an opening angle of about 90°, or in other words in a position in which they are essentially oriented co-planar with the corresponding side wall of the oven cavity, if said door wing(s) comprises the above-described rail on its cavity-side surface that supports said tray or grid. Because of the door wings are locked at said angle or co-planar alignment, also said rails on door wings are fixed in a co-planar alignment with the corresponding rails on the side walls of the oven cavity side walls such that they stably support an essentially horizontal movement of a tray or grid safely in and out of the oven cavity.

Such door locking mechanism in case of side opening doors such as the door according to the present invention, i.e. the door wings being hinged about a substantially vertical axis, advantageously supports or substitutes a closing pressure.

Such door locking mechanism, preferably comprising a spring-loaded clamping cam and a corresponding plug, can be arranged between at least one of the door wings and the structure. Alternatively, such door locking mechanism, preferably comprising a spring-loaded clamping cam and a corresponding plug, may be arranged only between the first door wing and the structure. The latter embodiment is preferred particularly in the case where the first door wing is opened first, and where the second door wing is to be opened subsequently.

In an embodiment where the door lock mechanism is a detachable plug connection comprising a spring-loaded clamping cam and a is plug it is preferred to arrange at least one spring-loaded clamping cam on structure and to arrange the plug on the inner surface of the door wing.

The plug is pressed into the spring-loaded clamping cam receiving said plug, for closing the locking mechanism, whereas the plug has to be pulled out of the spring-loaded clamping cam against the spring force holding the plug for opening of the locking mechanism. Such locking mechanism may be advantageously applied as a door locking mechanism for locking the door wings in both, an open or a closed position.

In an advantageous embodiment of the inventive domestic oven the domestic oven comprises at least one motor, in particular wherein the domestic oven comprises in addition means for operating said motor, and said motor is arranged for driving a pivotal movement of at least one of the first door wing and of the second door wing between said closed positions (e, g) and said open positions (d, f), preferably wherein said pivotal movement is a synchronized movement of said first and said second door wings, still preferably wherein the motor is arranged for driving said door linkage system.

Such motor may be configured to assist or perform the pivotal movement of the first door wing and/or of the second door wing between said closed positions and said open positions. For example, the motor may be connected to a sensor mechanism, which may recognize a pulling action on a first handle or any other signal or action of a user intended to initiate a motor action. For example, a user may also press on a surface or surface part of the domestic oven which the sensor may receive as a signal to initiate a motor action. However, such motor action may also be initiated by the user by conventional means, e.g. activating an operating element, e.g. pressing a key. Accordingly after activating such motor action, the motor drives a pivotal movement of the first door wing and/or of the second door wing between said closed positions and said open positions. As a result one or both door wings may be in an open or closed position.

Preferably, at an open position of the first door wing and the second door wing an opening angle is of at least about 90°. Preferably, an at least one hinge is a motor operated hinge, and more preferably the domestic oven comprises means for operating such motor for an opening/closing movement of the respective hinge. This, more preferably, allows the possibility to synchronize an opening/closing movement of both door wings.

In connection with the present invention it will be understood that referring to a movement of a door or a door wing as an opening or closing, preferably comprises also the according reverse movement. E.g. referring to an opening/closing movement means the movement from an open position or an essentially open position to a closed position, however, preferably also comprises the movement from a closed position to an open or essentially open position.

In an advantageous embodiment of the inventive domestic oven the door linkage system is configured such that the first door wing is connected to a first end of a first extended support pivotally about the vertical axis (a) at its first vertical edge, and the second door wing is connected to a first end of a second extended support pivotally about the vertical axis (a') at its first vertical edge, wherein a second end of the first extended support is pivotally connected to a first end of a first control arm and a second end of the second extended support is pivotally connected to a first end of a second control arm, and wherein a second end of the first control arm is pivotally connected to the second end of the second control arm about a central axis (k), wherein said central axis (k) comprises a guide rod that is arranged within a guiding slot that receives said guide rod such that said guide rod is slidably guided within said guide slot upon a synchronized pivotal movement of said first door wing and said second door wing between said closed positions (e, g) and said open positions (d, f) thereof.

In an alternative advantageous embodiment of the inventive domestic oven, the door linkage system is configured such that the first door wing is connected to a first end of a first extended support pivotally about the vertical axis (a) at its first vertical edge, and the second door wing is connected to a first end of a second extended support pivotally about the vertical axis (a') at its first vertical edge, wherein a second end of the first extended support is pivotally connected to a first end of a first control arm and a second end of the second extended support is pivotally connected to a first end of a second control arm, wherein the second end of the first control arm is pivotally connected to a first end of a connection strut, and the second end of the second control arm is pivotally connected to a second end of said connection strut, wherein said connection strut is mounted pivotally about a central axis (h), wherein said connection strut is capable of performing a pivotal movement around said central axis (h) upon a synchronized pivotal movement of said first door wing and said second door wing between said closed positions (e, g) and said open positions (d, f).

In a preferred embodiment of the domestic oven according to the present invention, a door linkage system kinetically interconnects said first door wing and said second door wing for a synchronized pivotal movement of said first door wing and said second door wing. For this purpose a door linkage system may comprise at least one, preferably two, extended support. Such extended support, preferably a first extended support, is mounted with its first end to an at least one door wing at the vertical axis of the at least one door wing and is connected to the at least one door wing such that its second end extends right angled away from the cavity-sided surface of the at least one door wing. It will be understood that an opening movement of the at least one door wing pivotally around the vertical axis of said at least one door wing, will also result in a movement of said extended support pivotally around said vertical axis and bring the second end of the extended support towards the front of the cavity. Said second end of the extended support is pivotally connected to a first end of a control arm.

In a preferred embodiment of the domestic oven according to the present invention such door linkage system comprises at the first door wing a first extended support and at the second door wing a second extended support, the first extended support pivotally connected at its second end to a first end of a first control arm, and the second extended support pivotally connected at its second end to a first end of a second control arm.

In a preferred embodiment of the domestic oven according to the present invention, the first control arm at its second end is pivotally connected to a first end of a connection strut and the second control arm at its second end is pivotally connected to a second end of a connection strut. Such connection strut is, preferably, of oblong shape. Such connection strut is, preferably, pivotally mounted about a central axis (h).

In a preferred embodiment of the domestic oven according to the present invention the first door wing and the second door wing comprises at least one, preferably one, extended support each.

In an alternatively preferred embodiment of the domestic oven according to the present invention, a door linkage system comprises at least one control arm, preferably pivotally connected with a first end of the control arm to the second end of an extended support. A second end of said control arm, preferably is pivotally connected to a guide a guide rod that is arranged within a guiding slot that receives said guide rod such that said guide rod is slidably guided within said guide slot upon a synchronized pivotal movement of said first door wing and said second door wing between said closed positions (e, g) and said open positions (d, f) thereof.

Where the first and the second control arm at their second ends are pivotally connected about the axis (k), to a guide rod that is arranged within a guiding slot that receives said guide rod such that said guide rod is slidably guided within said guide slot upon a synchronized pivotal movement of said first door wing and said second door wing between said closed positions (e, g) and said open positions (d, f), it will be immediately understood that upon an opening movement of at least one door wing, the guide slot, p, preferably, guides the central axis (k) comprising the guide rod within the guide slot, along the slot, preferably the slot forming an axis towards the front of the cavity, wherein said sliding axis is, more preferably, an axis perpendicular to the a plane formed by the frontal opening of the cavity. A guide slot, preferably, is arranged such that it is for guiding the axis (k).

In a preferred embodiment, such guide slot may have an oblong shape, preferably a rounded oblong shape. Said guide slot, preferably is comprised in a slotted guiding block and/or slotted link rod, and may further comprise an oblong slot as the guiding slot arranged at a longitudinal axis of said guiding block and/or slotted link rod for receiving and guiding the axis (k), particularly, formed by a connection of the second ends of the first and the second control arm.

Where the first control arm at its second end is pivotally connected to a first end of a connection strut and the second control arm at its second end is pivotally connected to a second end of a connection strut and wherein such connection strut is, preferably, of oblong shape and, more preferably, pivotally mounted about a central axis (h), it will be immediately understood that upon an opening movement of a door wing the connection strut is forced by the movement of the extended support connected to the door wing being opened, and the movement of the control arm connected to said extended support to pivotally rotate about its central axis. Said rotational movement of the connection strut around its central axis (h) leads to a simultaneous opening movement of the other door wing. This is, as the rotational movement of the connection strut exhibits a pulling or pushing force on the other control arm and thus on the extended support connected to the other door wing.

It will be understood that a further advantage of the domestic oven according to the present invention is compared to a so-called "Side Opening Door", which both door wings may be used for such extended supports as described herein. In connection therewith, it is immediately understood that an opening position of at least or of 90° of both door wings allows to slide out a tray outside of the cavity.

It will be understood that this is particularly the case, if both door wings may be fixed in an opening position of at least or of 90°.

This leads to a once more improved accessibility to the cooking goods.

In a preferred embodiment of the domestic oven according to the present invention a door linkage system and/or a door opening is motor or spring controlled and/or motor or spring driven.

In an advantageous embodiment of the inventive domestic oven the first door wing and/or the second door wing respectively at its vertical edge is mounted pivotally about a vertical axis (a, a') with at least one hinge.

Such hinge is of particular advantage to allow a pivotal opening/closing movement of the hinged door wing.

In a preferred embodiment of the invention, the at least one vertical edge, preferably is mounted pivotally about a vertical axis with at least one hinge, wherein the door and/or the door linkage system comprises a door lock mechanism, which is capable of locking at least one of the at least one hinge, if present, and/or at least one of the door wings such that at least one of the door wings is locked in its closed position and/or in its open position.

Preferably, at least one of the door wings is equipped with a door hinge that can be locked in an opening position, preferably at an opening angle of 90°. This is advantageous because the door is prevented from closing on its own.

In a preferred embodiment of the invention, the at least one first hinge can be locked in an opening position of the first door, preferably at an opening angle of 90°, and/or wherein the at least one second hinge can be locked in an opening position of the second door, preferably at an opening angle of 90°.

In an advantageous embodiment of the inventive domestic oven the first door wing in said closed position (e), and the second door wing in said closed position (g), each covers about half the area of the frontal opening.

It will be understood that both door wings may be of the same size, however, it is also an embodiment of the domestic oven according to the present invention that a first door wing has larger dimensions than a second door wing, or vice versa. Thereby, it is to be understood that such larger dimensions particularly refer to a horizontal dimension of each door. It is preferred that both door wings together cover the complete frontal opening in a closed position and thus close the cavity. It will, however, be understood that a larger first door wing may cover, for example, two-third and a smaller second door wing may cover one-third, of the frontal opening.

In an advantageous embodiment of the inventive domestic oven the door, in particular at least one door wing, and/or at least one thermal shield and/or at least one first handle and/or at least one second handle is configured such that the at least one thermal shield and/or the at least one first handle and/or the at least one second handle is detachably mountable, preferably by a user, to each of said door wings.

It will be immediately understood that left-handers will prefer a configuration of the first handle being at the left door wing seen from the position of the user, whereas right-handers will prefer a configuration of the first handle being at the right door wing seen from the position of the user. Accordingly, it is preferred that a user is able to adjust the configuration to his needs. This is particularly facilitated in that the first and/or the second handle, as well as respective mounting points at the door wings are configured and arranged such that the first handle and/or the second handle is detachably mountable, and thus, the user may mount the first handle to the first and/or the second door wing, and the second handle to the first and/or the second door wing.

This is of particular advantage in that a flexible adjustment to the user's needs is provided. This is particularly advantageous over the appliances known in the prior art, particularly in connection with one-winged doors, e.g. at refrigerators or fridges, where the entire door hinge system has to be changed in order to change the opening direction.

All described embodiments of the invention have the advantage, that a domestic oven is provided having improved user comfort in operating said oven and enables an improved access to the food and to the cavity. More particularly, the door according to the various embodiments of the domestic appliance according to the present invention is particularly useful in connection with domestic ovens having a door of a height which makes access to the cavity, e.g. for reasons of cleaning, difficult and particularly without demounting of the entire door. Furthermore a domestic oven is provided having an improved seal and tightness in a closed position.

Particularly where the door has a height of more than about 40 cm or more than about 45 cm and/or for small people and/or where the domestic oven is built in at eye-level access to the cavity is facilitated with the domestic appliance according to the present invention. Also the access to the cavity is facilitated in domestic appliances according to the present invention where the cavity has other dimensions than substantially the same height, depth and width, e.g. having a substantially greater width than height, e.g. having more than about 30% greater width.

The present invention will be described in further detail with reference to the drawings, in which.

Figure 1A:
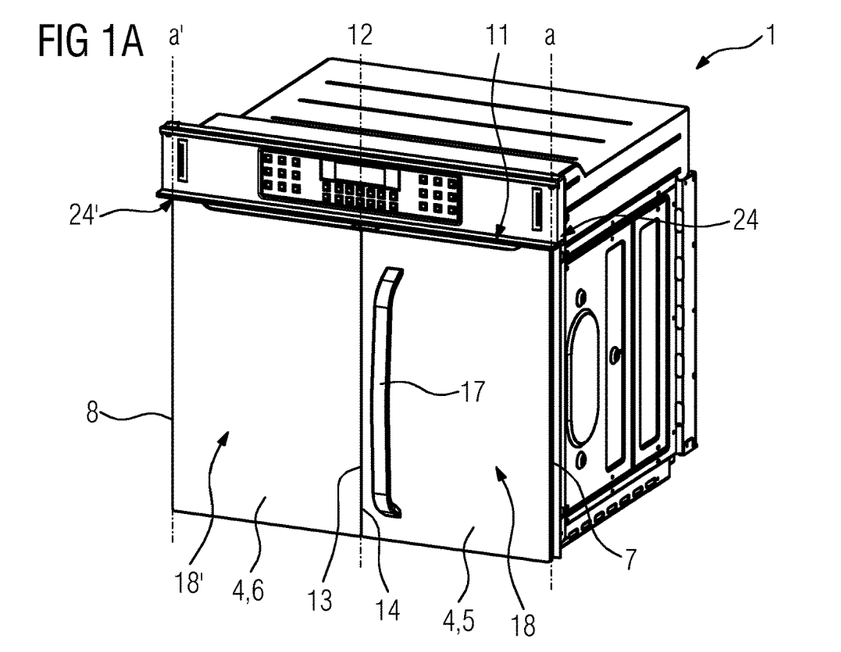
FIG. 1A illustrates a perspective view of a schematic drawing of a domestic oven, the door wings being in a closed position, showing a first inventive embodiment.
Figure 1B:
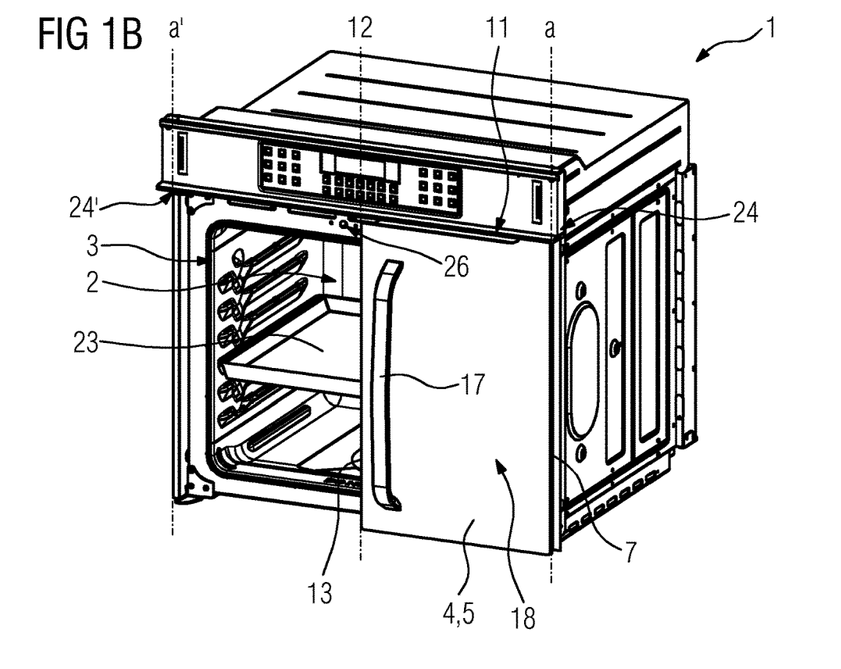
FIG. 1B illustrates a perspective view of a schematic drawing of a domestic oven, the left door wing being disassembled for better illustration, the right door wing being in a closed position, showing the first inventive embodiment.
Figure 2:
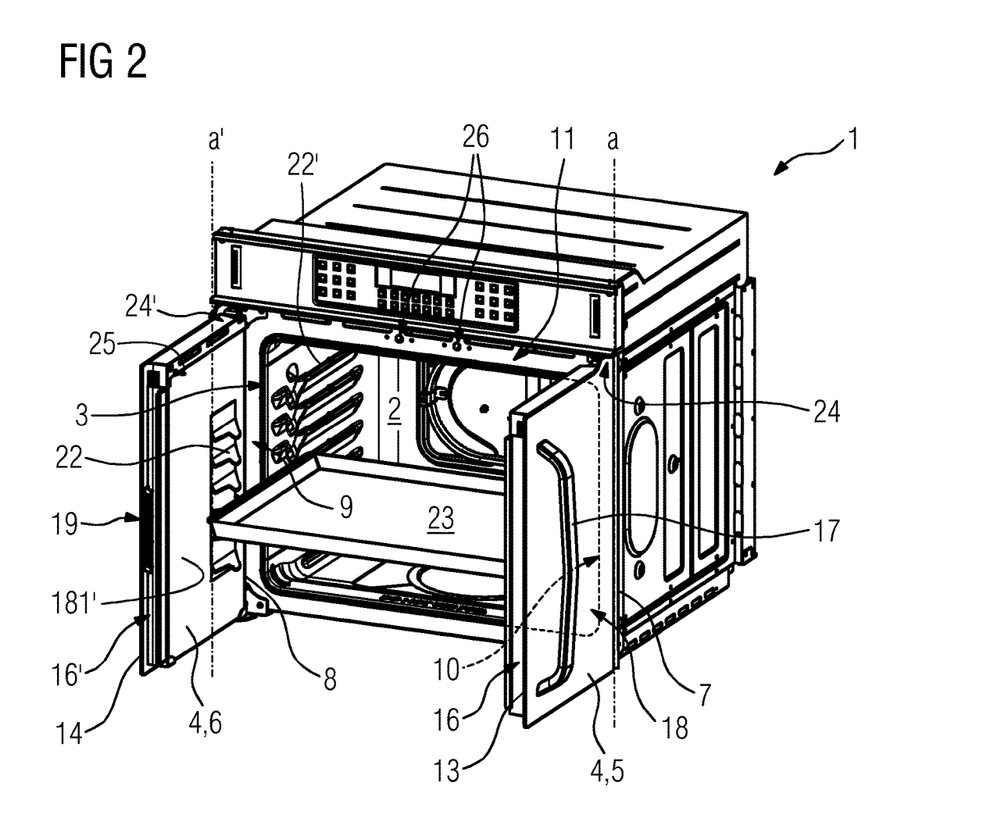
FIG. 2 illustrates a perspective view of a schematic drawing of a domestic oven the door wings being in an open position showing the first inventive embodiment.

FIG. 1A and FIG. 1B, and FIG. 2 show a domestic oven 1 according to a first inventive embodiment of the present invention, here a baking oven 1. In FIG. 1B the left door wing 6 is not shown for the purpose of better illustration and convenience of the reader. FIG. 2 shows the baking oven 1 as shown in FIG. 1A and FIG. 1B having a heatable oven cavity 2 with a frontal opening 3, and a door 4 for closing said frontal opening 3. The door 4 comprises a first door wing 5 and a second door wing 6, wherein each door wing 5 and 6, respectively, comprises a first vertical edge 7 and 8, respectively, that is mounted pivotally about a vertical axis a and a', respectively, on one of the opposite sides 9 and 10 of said frontal opening 3 to the structure 11 of the baking oven 1 for a movement between a closed position c of the door 4, as shown in FIG. 1A and an open position b of the door 4 as shown in FIG. 2. Here, in the closed position c as shown in FIG. 1A the door wings 5 and 6 form a vertical gap 12 between adjacent second vertical edges 13 and 14 of either door wing 5 and 6.

The baking oven 1 thereby is characterized in that the baking oven 1, particularly the door 4, further comprises a first thermal shield 16 that is arranged at said second vertical edge 13 of the first door wing 5 at a cavity-side surface 181 of said first door wing 5 such that it essentially covers laterally said vertical gap 12. Moreover, the baking oven 1, particularly the door 4, further comprises a second thermal shield 16' that is arranged at said second vertical edge 14 of the second door wing 6 at a cavity-side surface 181' of said second door wing 6 such that it essentially covers laterally said vertical gap 12.

The thermal shield 16 and 16' is manufactured of a heat resistant material, preferably selected from enameled steel, ceramic or LCP plastics.

As shown in FIG. 1A, FIG. 1B and FIG. 2 the first door wing 5 is pivotally mounted to the structure 11 of the baking oven 1 about a first vertical axis (a) with a first hinge 24 at a first vertical edge 7 of the first door wing 5, and the second door wing 6 is pivotally mounted to the structure 11 of the baking oven 1 about a second vertical axis a' with a second hinge 24' at a first vertical edge 8 of the second door wing 6, for closing a frontal opening 3 of a heatable oven cavity 2. It can be immediately seen that each door wings 5 and 6 comprise a first vertical edge 7 and 8, respectively, that is mounted pivotally about a vertical axis a and a', respectively, on one of the opposite sides 9 and 10, respectively, of the frontal opening 3. In a closed position c, as shown in FIG. 1A, the first door wing 5 and the second door wing 6 meet at a central line forming a vertical gap 12 between adjacent second vertical edges 13 and 14, respectively, of either door wing 5 and 6. The first door wing 5 in said closed position e, and the second door wing 6 in said closed position g, as shown in FIG. 1A, each covers half the area of the frontal opening 3, wherein both door wings 5 and 6 are of the same size and together cover the whole frontal opening 3 in said closed position c and thus close the cavity 2. The first door wing 5 and the second door wing 6 are thereby arranged on the opposite sides 9 or 10, preferably on a left side 10 and right side 9 of the frontal opening 3 of the baking oven 1, respectively. Moreover, the door 4 may comprise at least one elastic sealing 15 and 15', respectively, for sealing said vertical gap 12, wherein the elastic sealing 15 and 15' is arranged on the second vertical edges 13 and 14, respectively, of said first door wing 5 and of said second door wing 6, respectively.

Figure 4:
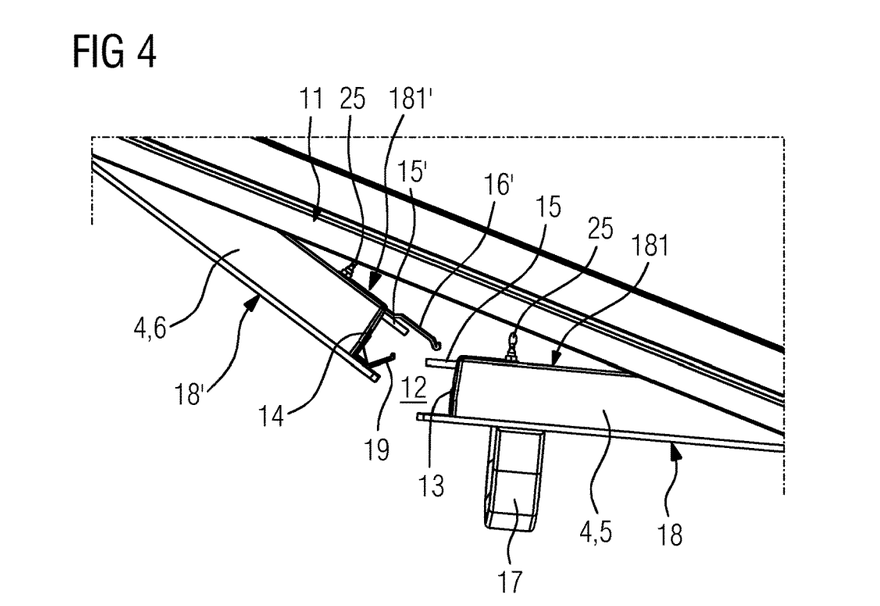
FIG. 4 illustrates a close-up top view of the vertical gap of a domestic oven showing a third inventive embodiment.
Figure 5:
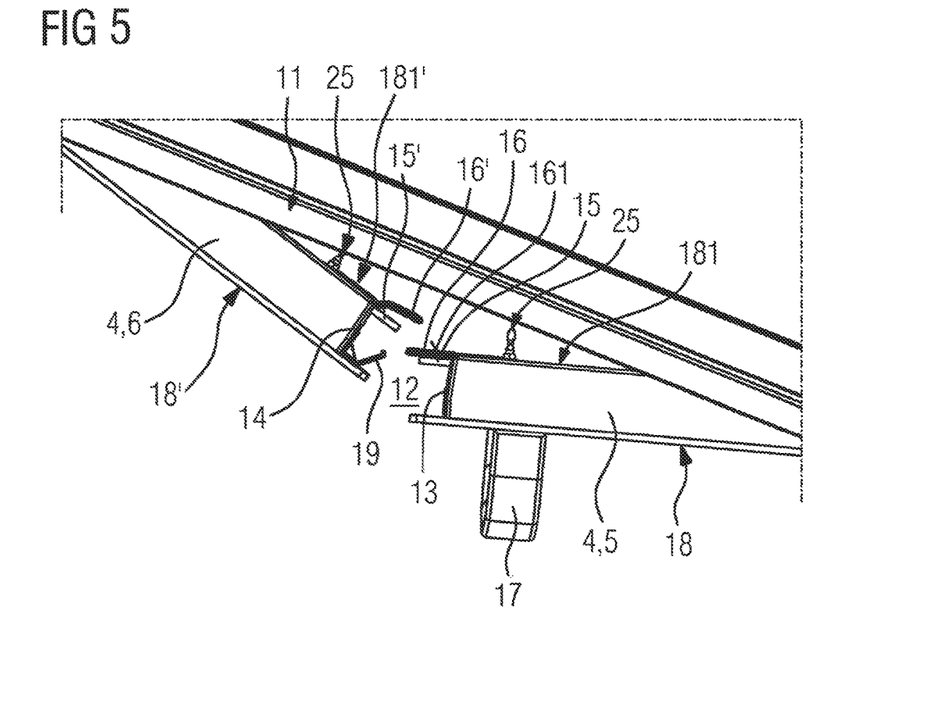
FIG. 5 illustrates a close-up top view of the vertical gap of a domestic oven showing a fourth inventive embodiment.

According to the third and fourth embodiment shown in FIG. 4 and FIG. 5, respectively, The first door wing 5 comprises a first elastic sealing 15 at a second vertical edge 13 of said first door wing 5, and said second door wing 6 comprises a second elastic sealing 15' at a second vertical edge 14 of said second door wing 6.

Figure 6:
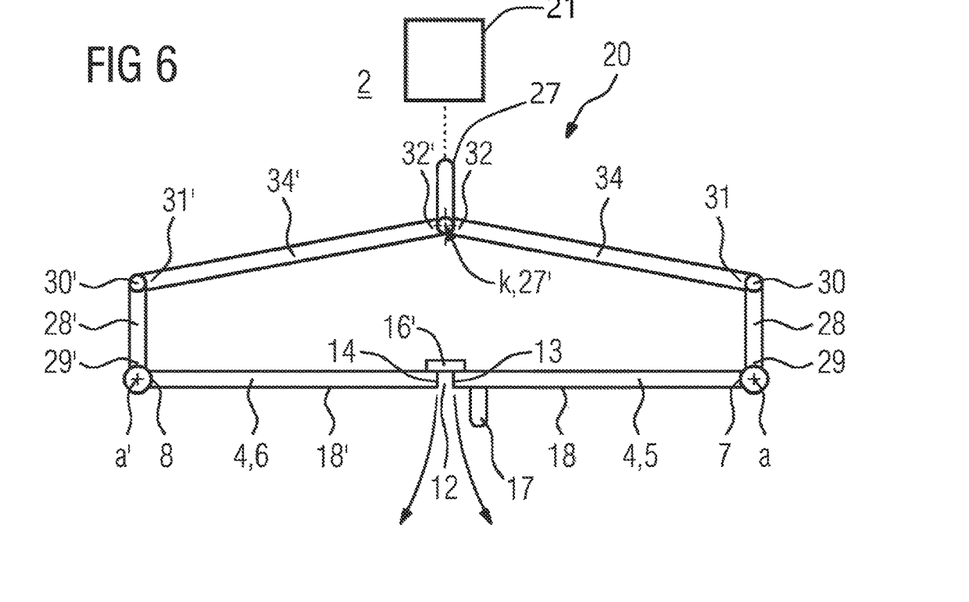
FIG. 6 illustrates a schematic drawing of a door linkage system showing a fifth inventive embodiment.

Both FIG. 5 and FIG. 6, moreover, show a baking oven 1 according to the present invention such as the baking oven 1 according to the first inventive embodiment shown in FIG. 1A, 1B and FIG. 2, wherein the first elastic sealing 15 and the second elastic sealing 15' both are sealing the vertical gap 12 at a central line in said closed position c of the door 4 where the door wings 5 and 6 form said vertical gap 12 between adjacent second vertical edges 13 and 14 of either door wing 5 and 6. It will be immediately understood that such elastic sealing 15 and 15' is advantageously sealing the cavity 2 and thus prevents and/or reduces heat loss through the vertical gap 12. As shown in FIGS. 4 and 5 such sealing of the vertical gap 12 between the two door wings 5 and 6 may be split in two parts, i.e. one first elastic sealing 15 is arranged at a second vertical edge 13 of the first door wing 5 and one second elastic sealing 15' is arranged at a second vertical edge 14 of said second door wing 6. Thereby, in a closed position of both door wings, i.e. the first door wing 5 being in a closed position e, and the second door wing 6 being in a closed position g, thus the door 4 being in a closed position c, the elastic sealings 15 and 15' contact each other and lie in juxtaposition.

The baking oven 1 according to the third embodiment shown in FIG. 4, more particularly the second door wing 6 comprises a thermal shield 16' that is arranged such that it essentially traverses and covers laterally said vertical gap 12, wherein said thermal shield 16' essentially covers both of said elastic sealings 15 and 15' such that said elastic sealings 15 and 15' are shielded from the heatable oven cavity 2. Moreover, the second thermal shield 16' is arranged such that it overlaps a cavity-side surface 181 of said first door wing 5.

According to the fourth embodiment shown in FIG. 5 the first door wing 5 comprises a first thermal shield 16 and the second door wing 6 comprises a second thermal shield 16' and said second thermal shield 16' is arranged such that, in a closed position c of the door 4, it at least partially overlaps said first thermal shield 16 such that said first thermal shield 16 and said second thermal shield 16' essentially cover laterally said vertical gap 12. Thereby, advantageously said first thermal shield 16 and said second thermal shield 16' enhance and accumulate their shielding properties. Said first thermal shield 16 and said second thermal shield 16' essentially cover both of said elastic sealings 15 and 15' such that said elastic sealings 15 and 15' are shielded from the heatable oven cavity 2, wherein said second thermal shield 16' overlaps a cavity-side surface 161 of said first thermal shield 16.

According to the third and fourth embodiment of the present invention a first thermal shield 16 is arranged on a second vertical edge 13 of said first door wing 5 and a second thermal shield 16' is arranged on the second vertical edge 14 of said second door wing 6.

Nevertheless, it will be immediately understood that said shielding effect of the thermal shield 16 and/or 16' is mainly effective where at least one door wing 5 and 6, preferably both door wings 5 and 6, is/are in a closed position e and g, respectively. Particularly then, such thermal shield 16 and/or 16', protects the elastic sealing 15 and/or 15', respectively, and the vertical gap 12 against direct effect of heat and pollution from inside the cavity 2. Here the thermal shields 16 and 16' have the form of a rectangular plate, each, wherein the main plane of such thermal shield 16 and 16', is dimensioned according to the dimensions of the door wings 5 and 6 and the vertical gap 12. The dimensions of the thermal shields 16 and 16' are sufficient to cover the vertical gap 12 in a closed position c.

According to the first, the third and the fourth embodiment of the present invention the first door wing 5 and the second door wing 6, and, preferably the first thermal shield 16, and the second thermal shield 16', if present, and said elastic sealings 15 and 15' are arranged such that a movement of the second door wing 6 between a closed position g and an open position f is allowed if the first door wing 5 is in an at least partially open position d, and wherein said movement of the second door wing 6 is not allowed if the first door wing 5 is in a closed position e.

The door 4 of the baking oven 1 according to any one of the first, the third and the fourth embodiment of the present invention comprises at least one first handle 17 arranged at an outside surface 18 of at least said first door wing 5, in particular one of said first handle 17 is arranged at the outside surfaces 18 and/or 18' of each of said first door wing 5 and said second door wing 6.

Figure 3:
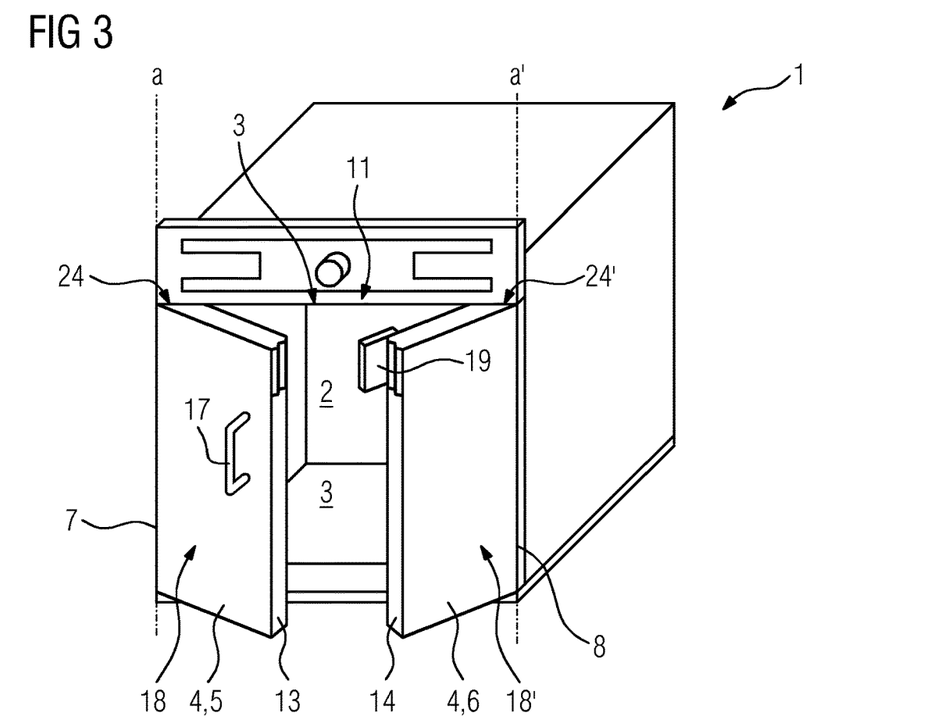
FIG. 3 illustrates a perspective view of a schematic drawing of a domestic oven the door wings being in a partially open position showing a second inventive embodiment.

The baking oven 1 according to the second embodiment of the present invention as shown in FIG. 3, comprises one first handle 17 arranged at an outside surface 18 of said first door wing 5, and one second handle 19 arranged at the second vertical edge 14 of the second door wing 6, said second handle 19 is accessible only if said first door wing 5 is in its open position d, and a movement of the second door wing 6 between said closed position g and said open position f is allowed, if the first door wing 5 is in said open position d. However, such movement is not allowed, if the first door wing 5 is in said closed position e.

Also the second door wing 6 according to the first embodiment of to the present invention as shown in FIG. 1, according to the third embodiment of to the present invention as shown in FIG. 4 and according to the fourth embodiment according of to the present invention as shown in FIG. 5 comprises such second handle 19 arranged at the second vertical edge 14 of said second door wing 6, wherein said second handle 19 is accessible only if said first door wing 5 is in its open position (d).

As shown for example in FIG. 4 for a door having a single protective shield 16' and two elastic seals 15 and 15', the door 4 can comprises at least one elastic sealing 15, 15' for sealing the vertical gap 12 against the escape of heat or steam from the oven cavity 2. The at least one elastic sealing 15, 15' can be arranged on at least one of said second vertical edges 13, 14 of the first door wing 5 and/or of the second door wing 6 or, as shown in FIG. 4, elastic seals can be arranged on both vertical edges 13, 14. A first elastic sealing 15 can be arranged on the second vertical edge 13 of the first door wing 5 and/or a second elastic sealing 15' can be arranged on the second vertical edge 14 of said second door wing 6. The at least one elastic sealing 15, 15' is adapted to bear elastically, as the case may be, against the opposing one of the second vertical edge 14, 13 of the second door wing 6 or of the first door wing 5 or—as actually in FIG. 4—against the opposing one of the second elastic sealing 15', 15 of the second door wing 6 or of the first door wing 5. The elastic sealing can be formed essentially of a high-temperature resistant silicone material that resists temperatures of up to 300° C. or of a glass-fiber material that resists temperatures of up to 450 to 500° C.

As may be taken from, for example, FIG. 5 said second handle 19 and the thermal shield 16 and/or 16' may be arranged such that such further handle 19 is protected and/or shielded from the heat of the oven cavity 2 by said thermal shield 16 and/or 16' and thus is prevented from being heated. Said arrangement improves the comfort for the user as such second handle 19 is arranged hidden in the vertical gap 12 and is kept at a temperature for being touched immediately after opening a first door wing 5.

The first door wing 5 comprises one first handle 17 arranged at an outside surface 18 of said first door wing 5, whereas in all shown embodiments no such first handle 17 is arranged at an outside surface 18' of said second door wing 6. It will be immediately understood that in the configuration according to the embodiments shown in the FIGS. such first handle 17 is for opening said first door wing 5, preferably by pulling said handle 17, and that such second handle 19 is for opening said second door wing 6, preferably by pulling said handle 19. It will also be understood that said second handle 19 is hidden at or in the second vertical edge 14 and in the vertical gap 12, particularly if both door wings are closed. Thus, such second handle 19 is accessible only after the first door wing 5 is opened by the first handle 17. The second handle 19 is thus non-visible in a closed position c of the door 4 and can be used only, if a first door wing 5 is already in its opened position d or at least in a partially opened position.

As may be taken, particularly from FIG. 4 and FIG. 5 the baking oven 1, in particular the door 4, particularly the first door wing 5 and the second door wing 6, and/or a door linkage system 20 comprise a door lock mechanism 25, 26 for locking at least one of the first door wing 5 and/or the second door wing 6, respectively, in a closed position c, e or g. It is to be understood that the door lock mechanism 25, 26 allows to fix the door 4 or at least one door wing 5 or 6 in such closed position c, e or g. More particularly, the door wings 5 and 6 each are provided with a plug 25 which can be inserted into the respective spring-loaded clamping cam 26, and thus the door 4, particularly the door wings 5 and 6 can be locked in a closed position.

In other words, such door lock mechanism 25 is capable of locking at least one of the at least one of the door wings 5 and 6, respectively, such that at least one of the door wings 5 and 6 is locked in its closed position e and/or g.

Other door lock mechanisms may be considered, particularly able to look said hinge 24, 24'.

Also a door lock mechanism can be realized which, additionally or alternatively allows to lock each door wing in its open position d and/or f.

Such locking mechanism 25, 26 may be provided allowing to lock the door 4, particularly the door wings 5 and 6, in an open position, particularly locking the first door wing 5 at an opening angle of 90°, and the second door wing 6, at an opening angle of 90°. This is advantageous because the door 4 and/or a door wing 5 and/or 6 is prevented from closing on its own.

As may be best seen from FIG. 2 the baking oven 1 according to the shown embodiment, more particularly said first door wing 5 and said second door wing 6 comprises at its respective cavity-side surface 181 and 181' rails 22 for supporting a tray 23 or a sheet 23', wherein said tray 23 or sheet 23' can be moved in and out of the oven cavity 2 on a corresponding rail 22' on a side wall of the cavity 2.

As may be also best seen from FIG. 2 said rail 22 on at least one door wing 5 and 6 comprises a first end region facing the cavity 2, wherein said at least one rail 22 is configured such that said first end region slopes downwards, which advantageously allows an easy insertion or sliding out of the tray 23 or sheet 23' without interference with the side rails 22', particularly in the gap. It will be immediately understood that such rail 22 advantageously supports the tray 23 or sheet 23' if pulled out of the cavity 2.

FIGS. 4 and 5 both show a door linkage system 20, more precisely, a mechanical door linkage system 20 comprised in the baking oven 1, wherein the door linkage system 20 that is configured such that said first door wing 5 and said second door wing 6 are kinetically interconnected for and/or capable of a synchronized pivotal movement of said first door wing 5 and said second door wing 6 between said closed positions e and g, respectively, and said open positions d and f, respectively. In particular, in a synchronized successive pivotal movement first said first door wing 5 and then said second door wing 6 move between said closed positions e and g, respectively, and said open positions d and f, respectively. Such door linkage system 20, moreover, is configured such that the first door wing 5 and the second door wing 6 are interconnected for a synchronized pivotal opening/closing movement, as depicted by the bent arrows, of the first door wing 5 and the second door wing 6, respectively. Thereby, the first door wing 5 and the second door wing 6 are connected via a linkage system which enabling a synchronized opening and closing procedure of both door wings 5 and 6. Both door wings 5 and 6 may be opened simultaneously with a one hand movement, only by operating one first handle 17 of a first door wing 5, wherein the first door wing 5 and the second door wing 6 are mechanically coupled by the elements of the door linkage system 20.

Figure 7:
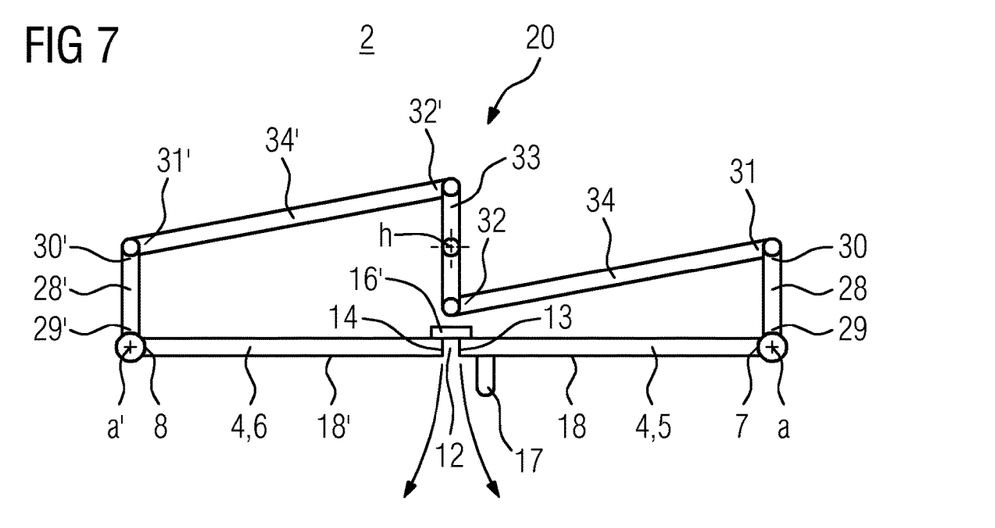
FIG. 7 illustrates a schematic drawing of a door linkage system showing a sixth inventive embodiment.

According to fifth and sixth embodiment of the present invention shown in FIG. 6 and FIG. 6, respectively, the door linkage system 20 is configured such that the first door wing 5 is connected to a first end 29 of a first extended support 28 pivotally about the vertical axis (a) at its first vertical edge 7, and the second door wing 6 is connected to a first end 29' of a second extended support 28' pivotally about the vertical axis a' at its first vertical edge 8, wherein a second end 30 of the first extended support 28 is pivotally connected to a first end 31 of a first control arm 34 and a second end 30' of the second extended support 28' is pivotally connected to a first end 31' of a second control arm 34'. According to the embodiments five and six as shown in FIG. 6 and FIG. 7, respectively, such extended support 28 and 28', respectively, is mounted with its first end 29, 29' to an at least one door wing 5, 6 at the vertical axis a, a' of the at least one door wing 5, 6 and is connected to the at least one door wing 5, 6 such that its second end 30, 30' extends right angled away from the cavity-sided surface 181, 181' of the at least one door wing 5, 6. It will be understood that an opening movement of the at least one door wing 5, 6 pivotally around the vertical axis a, a' of said at least one door wing 5,6, will also result in a movement of said extended support 28, 28' pivotally around said vertical axis a, a' and bring the second end 30, 30' of the extended support 28, 28' towards the front of the cavity 2. Said second end 30, 30' of the extended support 28, 28' is pivotally connected to a first end 31, 31' of a control arm 34, 34'.

According to the fifth embodiment as shown in FIG. 6 a second end 32 of the first control arm 34 is pivotally connected to a second end 32' of the second control arm 34' about a central axis (k), wherein said central axis (k) comprises a guide rod 27 that is arranged within a guiding slot 27' that receives said guide rod 27 such that said guide rod 27 is slidably guided within said guide slot 27' upon a synchronized pivotal movement of said first door wing 5 and said second door wing 6 between said closed positions e and g, respectively, and said open positions d and f, respectively, thereof.

In an opening movement of the at least one door wing 5 and/or 6, as depicted as bent arrows, the central axis (k) and the comprised sliding rod 27 will slide forward and backward in the guiding slot 27' an thus allow the control arms 34 and 34' to mediate the synchronization of the opening and/or closing movement of the door wings 5 and 6. More particularly, the first and the second control arm 34 and 34' at their second ends 32 and 32' are pivotally connected, to the guide rod 27. It will be immediately understood that upon an opening movement of a door wing 5 and/or 6, respectively, as depicted by the bent arrow, the guide rod 27, moves along an axis, towards the front of the cavity 2, wherein the axis is, more preferably, an axis perpendicular to the a plane formed by the frontal opening 3 of the cavity 2. Such guide rod 27, preferably is moving within a guiding slot 27' comprised in a slotted guiding block and/or slotted link rod, having an oblong shape, rounded at its ends. Said guiding slot 27' is an oblong slot arranged at a longitudinal axis of a guide mechanism, e.g. a slotted guiding block and/or slotted link rod, for receiving and guiding the guide rod 27 constituting the connection of the second ends 32 and 32' of the first and the second control arms 34 and 34', i.e. the central axis (k).

According to the sixth embodiment as shown in FIG. 7 a second end 32 of the first control arm 34 is pivotally connected to a first end of a connection strut 33, and the second end 32' of the second control arm 34' is pivotally connected to a second end of said connection strut 33, wherein said connection strut 33 is mounted pivotally about a central axis (h), wherein said connection strut 33 is capable of performing a pivotal movement around said central axis (h) upon a synchronized pivotal movement of said first door wing 5 and said second door wing 6 between said closed positions e and g, respectively, and said open positions d and f, respectively. Such connection strut 33 is of oblong shape and is pivotally mounted about its central axis h. It will be immediately understood that upon an opening movement of a door wing 5 and/or 6, as depicted by the bent arrows, the connection strut 33 is forced by the movement of the extended support 28 and 28' connected to the door wings 5 and 6, respectively, being opened, and the movement of the control arm 34 and 34', respectively, connected to said extended support 28 to pivotally rotate about its central axis h. Said rotational movement of the connection strut 33 leads to a synchronized opening movement of the respective other door wing 5 or 6, respectively. This is, as the rotational movement of the connection strut 33 exhibits a pulling or pushing force on the other control arm 34 and 34', respectively, and thus on the extended support 28 connected to the respective other door wing 5 or 6, respectively.

A domestic oven 1 as shown in the embodiments depicted in the FIGS. also may comprise at least one motor 21, in particular wherein the domestic oven 1 comprises in addition means for operating said motor 21, and said motor 21 is arranged for driving a pivotal movement of at least one of the first door wing 5 and of the second door wing 6 between said closed positions e and g, respectively, and said open positions d and f, respectively, preferably wherein said pivotal movement is a synchronized movement of said first and said second door wings 5 and 6, still preferably wherein the motor 21 is arranged for driving said door linkage system 20.

In the shown embodiments of the baking oven 1 according to the present invention the door 4, in particular at least one door wing 5 and 6, respectively, and/or at least one thermal shield 16 and 16', respectively, and/or at least one first handle 17 and/or at least one second handle 19, respectively, is configured such that the at least one thermal shield 16 and 16', respectively, and/or the at least one first handle 17 and/or the at least one second handle 19, respectively, is detachably mountable to each of said door wings 5 and 6, respectively. Thus, the arrangement and positioning of handles 17 and 19, thermal shields 16 and 16' can be adapted to the individual user's needs and, moreover, the components may be advantageously demounted for facilitated cleaning.

A motor applied in the door linkage system according to FIG. 6 or FIG. 7, for example, and connected to a hinge 24 or 24' of one or both of the door wings 5 and/or 6, suitable for driving a pivotal movement of the first door wing 5 and/or of the second door wing 6 will drive a synchronized pivotal opening/closing movement.

The features of the present invention disclosed in the specification, the claims, and/or the figures may both separately and in any combination thereof be material for realizing the invention in various forms thereof.

LIST OF REFERENCE NUMERALS 1 baking oven
2 heatable oven cavity
3 frontal opening
4 door
5 first door wing
6 second door wing
7 first vertical edge of the first door wing
8 first vertical edge of the second door wing
9, 10 opposite sides of frontal opening
11 structure of the baking oven
12 vertical gap
13 second vertical edge of the first door wing
14 second vertical edge of the second door wing
15 first elastic sealing
15' second elastic sealing
16 first thermal shield
16' second thermal shield
161 cavity-side surface of first thermal shield
17 first handle
18, 18' outside surface of door wing
181 cavity-side surface of first door wing
181' cavity-side surface of second door wing
19 second handle
20 door linkage system
21 motor
22 rail on door wing 22' rail on cavity side wall
23 tray
23' grid
24, 24' hinge
25 door lock mechanism plug
26 spring-loaded clamping cam
27 guide rod
27' guiding slot
28 first extended support
28' second extended support
29 first end of first extended support
29' first end of second extended support
30 second end of first extended support
30' second end of second extended support
31 first end of first control arm
31' first end of second control arm
32 second end of first control arm
32' second end of second control arm
33 connection strut
34 first control arm
34' second control arm
(a), (a') vertical axis
(b) open position of door
(c) closed position of door
(d) open position of said first door wing
(e) closed position of said first door wing
(f) open position of the second door wing
(g) closed position of the second door wing
(h) central axis of connection strut
(k) central axis of control arm pivot

The invention claimed is:

1. A domestic oven comprising a heatable oven cavity having a frontal opening having opposite sides, and a door for closing said frontal opening, wherein the door comprises a first door wing and a second door wing, wherein each door wing comprises a first vertical edge that is mounted pivotally about a vertical axis respectively on one of the opposite sides of said frontal opening to a structure of the domestic oven for a movement between a closed position and an open position of the door, wherein in said closed position of the door the door wings form a vertical gap between adjacent second vertical edges of either door wing, wherein at least one elastic sealing is arranged on at least one of said second vertical edges of said first door wing or of said second door wing in order to seal said vertical gap against escape of heat or steam from said oven cavity when the door in the closed position, wherein at least one thermal shield arranged at the second vertical edge of at least one of said door wings covers said at least one elastic sealing in the closed state of said door to shield said at least one elastic sealing from cooking heat from the heatable oven cavity in use and in said closed state.

2. Domestic oven according to claim 1, said at least one thermal shield being arranged at a cavity-side surface of the associated door wing, such the at least one thermal shield essentially covers laterally said vertical gap.

3. Domestic oven according to claim 2, wherein said at least one thermal shield is manufactured of a heat resistant material.

4. Domestic oven according to claim 2, wherein said at least one thermal shield comprises a first thermal shield arranged at the second vertical edge of the first door wing and a second thermal shield arranged at the second vertical edge of the second door wing, each said first and second thermal shields overlapping a cavity-side surface of the respective first or second door wing.

5. Domestic oven according to claim 2, wherein the first door wing comprises a first thermal shield and the second door wing comprises a second thermal shield and said second thermal shield is arranged such that it at least partially overlaps said first thermal shield such that said first thermal shield and said second thermal shield essentially cover laterally said vertical gap, wherein said first thermal shield and said second thermal shield essentially cover at least one of said at least one elastic sealing such that at least one of said at least one elastic sealing is shielded from the heatable oven cavity, wherein said second thermal shield overlaps a cavity-side surface of said first thermal shield.

6. Domestic oven according to claim 1, wherein said at least one elastic sealing comprises a first elastic sealing arranged on the second vertical edge of said first door wing and a second elastic sealing arranged on the second vertical edge of said second door wing, wherein each said first or second elastic sealing is adapted to bear elastically against the second vertical edge of the respective opposing first or second door wing, or against the opposing second or first elastic sealing, wherein said at least one elastic sealing is formed essentially of a high-temperature resistant silicone material that resists temperatures of up to 300° C. or of a glass-fiber material that resists temperatures of up to 450 to 500° C.

7. Domestic oven according to claim 1, wherein the first door wing and the second door wing, at least one of said at least one thermal shield, and/or at least one of said at least one elastic sealing is arranged such that a movement of the second door wing between a closed position and an open position is allowed if the first door wing is in an at least partially open position, and wherein said movement of the second door wing is not allowed if the first door wing is in a closed position.

8. Domestic oven according to claim 1, wherein the door comprises a first handle arranged at an outside surface of said first door wing, and a second handle arranged at the second vertical edge of said second door wing, wherein said second handle is accessible only if said first door wing is in its open position.

9. Domestic oven according to claim 1, wherein the domestic oven comprises a mechanical door linkage system configured such that said first door wing and said second door wing are kinetically interconnected for and/or are capable of a synchronized pivotal movement of said first door wing and said second door wing between said closed positions and said open positions, wherein in a synchronized successive pivotal movement first said first door wing and then said second door wing move between said closed positions and said open positions.

10. Domestic oven according to claim 9, wherein the door linkage system is configured such that the first door wing is connected to a first end of a first extended support pivotally about the vertical axis at its first vertical edge, and the second door wing is connected to a first end of a second extended support pivotally about the vertical axis at its first vertical edge, wherein a second end of the first extended support is pivotally connected to a first end of a first control arm and a second end of the second extended support is pivotally connected to a first end of a second control arm, and wherein a second end of the first control arm is pivotally connected to a second end of the second control arm about a central axis, wherein said central axis comprises a guide rod that is arranged within a guiding slot that receives said guide rod such that said guide rod is slidably guided within said guide slot upon a synchronized pivotal movement of said first door wing and said second door wing between said closed positions and said open positions thereof.

11. Domestic oven according to claim 9, wherein the door linkage system is configured such that the first door wing is connected to a first end of a first extended support pivotally about the vertical axis at its first vertical edge, and the second door wing is connected to a first end of a second extended support pivotally about the vertical axis at its first vertical edge, wherein a second end of the first extended support is pivotally connected to a first end of a first control arm and wherein the second end of the first control arm is pivotally connected to a first end of a connection strut and the second end of the second control arm is pivotally connected to a second end of said connection strut, wherein said connection strut is mounted pivotally about a central axis, wherein said connection strut is capable of performing a pivotal movement around said central axis upon a synchronized pivotal movement of said first door wing and said second door wing between said closed positions and said open positions.

12. Domestic oven according to claim 1, wherein the door and/or the door linkage system comprises a door lock mechanism, wherein said door lock mechanism is capable of locking at least one of the first or second door wings such that at least one of the door wings is locked in its closed position and/or in its open position, wherein the door lock mechanism is a detachable plug connection comprising a spring-loaded clamping cam and a plug.

13. Domestic oven according to claim 1, wherein the domestic oven comprises at least one motor, and means for operating said motor, and said motor is arranged for driving a pivotal movement of at least one of the first door wing or of the second door wing between said closed positions and said open positions, wherein said pivotal movement is a synchronized movement of said first and said second door wings, and wherein the motor is arranged for driving said door linkage system.

14. Domestic oven according to claim 1, wherein the first door wing and/or the second door wing respectively at its first vertical edge is mounted pivotally about the respective vertical axis with at least one hinge.

15. Domestic oven according to claim 1, wherein the first door wing in said closed position, and the second door wing in said closed position, each covers half the area of the frontal opening.

16. Domestic oven according to claim 1, wherein at least one said door wing, and/or said at least one thermal shield and/or at least one first handle and/or at least one second handle is configured such that the at least one thermal shield and/or the at least one first handle and/or the at least one second handle is detachably mountable to each of said door wings.

17. A domestic oven comprising a heatable oven cavity having a frontal opening having opposite sides, and a door for closing said frontal opening, wherein the door comprises a first door wing and a second door wing, wherein each door wing comprises a first vertical edge that is mounted pivotally about a vertical axis respectively on one of the opposite sides of said frontal opening to a structure of the domestic oven for a movement between a closed position and an open position of the door, wherein in said closed position of the door the door wings form a vertical gap between adjacent second vertical edges of either door wing, wherein said first door wing or said second door wing comprises, at its respective cavity-side surface, at least one rail for supporting a tray or a grid when said tray or grid is moved out of the oven cavity resting on a corresponding rail therein, said corresponding rail being on a side wall of said oven cavity at essentially the same height as said at least one rail on said at least one door wing.

\* \* \* \* \*